United States Patent

Pattantyus

[15] 3,663,884
[45] May 16, 1972

[54] FREQUENCY DIFFERENCE DETECTOR

[72] Inventor: Tamas I. Pattantyus, Pittsburgh, Pa.
[73] Assignee: Westinghouse Electric Corporation, Pittsburgh, Pa.
[22] Filed: Oct. 24, 1969
[21] Appl. No.: 869,268

[52] U.S. Cl. .............................................. 328/134, 328/109
[51] Int. Cl. ......................................................... H03b 3/04
[58] Field of Search .................. 324/79, 79 D, 78, 78 I, 83 A; 307/233, 235, 232, 295, 261; 328/155, 134, 133, 109-110, 140-141; 331/17

[56] References Cited

UNITED STATES PATENTS

| | | | |
|---|---|---|---|
| 3,112,450 | 11/1963 | Krause | 328/109 |
| 3,205,438 | 9/1965 | Buck | 324/83 A |
| 3,327,226 | 6/1967 | Nourney | 328/109 |
| 3,328,688 | 6/1967 | Brooks | 328/133 |
| 3,382,376 | 5/1968 | Sowden | 307/233 |
| 3,441,342 | 4/1969 | Ball | 328/134 |
| 3,509,476 | 4/1970 | Roth | 328/141 |
| 3,100,294 | 8/1963 | Dryden | 307/239 |

Primary Examiner—Donald D. Forrer
Assistant Examiner—R. E. Hart
Attorney—F. H. Henson, C. F. Renz and A. S. Oddi

[57] ABSTRACT

A system for detecting a frequency difference between a known reference frequency and an unknown frequency wherein both frequencies are delayed and respectively applied to a bistable element whose output state is utilized to control respectively a pair of AND logic elements which also receive signals as inputs respectively in response to the undelayed frequencies, an output from either of the AND elements being indicative that a frequency difference exists and the direction of the difference.

5 Claims, 2 Drawing Figures

WITNESSES
Alfred G. Colaizzi
James F. Young

INVENTOR
Tamas I. Pattantyus
BY
ATTORNEY

FREQUENCY DIFFERENCE DETECTOR

BACKGROUND OF THE INVENTION

1. Field of the Invention

The present invention relates to frequency difference detector systems and, more particularly, to such systems for use in digital applications wherein the direction of the frequency difference is also desired.

2. Discussion of the Prior Art

In many control applications, such as controlling the recording of video information on a magnetic recording disc, it is highly desirable to have an indication that a frequency difference exists between a known reference signal and an unknown frequency signal. It is also desirable to have an indication of the direction of the difference, that is, is the unknown frequency higher or lower in frequency than the reference frequency even though the absolute magnitude of the frequency difference is not required. Various frequency detection systems have been devised as shown, for example, in U.S. Pat. Nos. 3,235,800, 3,328,688, and 3,382,376. These patents, being representative of the prior art, have one common feature of utilizing two or more bistable elements (flip-flops) for detecting the frequency difference between a reference and an unknown frequency. The requirements for multiple bistable elements thus necessitates a relatively complex and expensive system for performing the frequency difference detection function and can hence result in a relatively expensive design. Therefore, it would be highly desirable if a frequency detection system were provided utilizing a minimum number of bistable elements and other relatively simple logic elements for providing the frequency detection function, while additionally providing a system capable of detecting very small frequency differences between the reference frequency and the unknown frequency on the order of 0.03 percent of the reference frequency.

SUMMARY OF THE INVENTION

Broadly the present invention provides a frequency difference detection system utilizing a single bistable element wherein the frequencies to be compared are time delayed before application to the bistable element, which controls other logic elements whose outputs are indicative of a frequency difference and the direction of that difference.

DESCRIPTION OF THE PREFERRED EMBODIMENT

Figure 1:
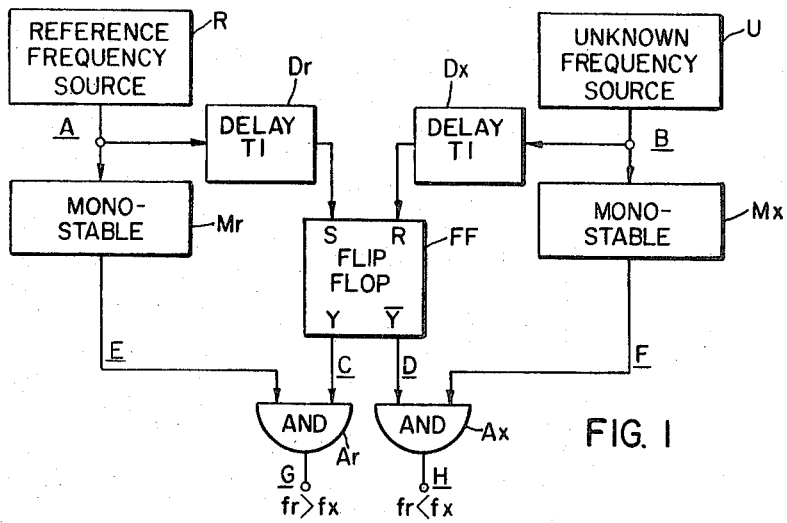
FIG. 1 is a block diagram of the frequency difference detection system of the present invention.
Figure 2:
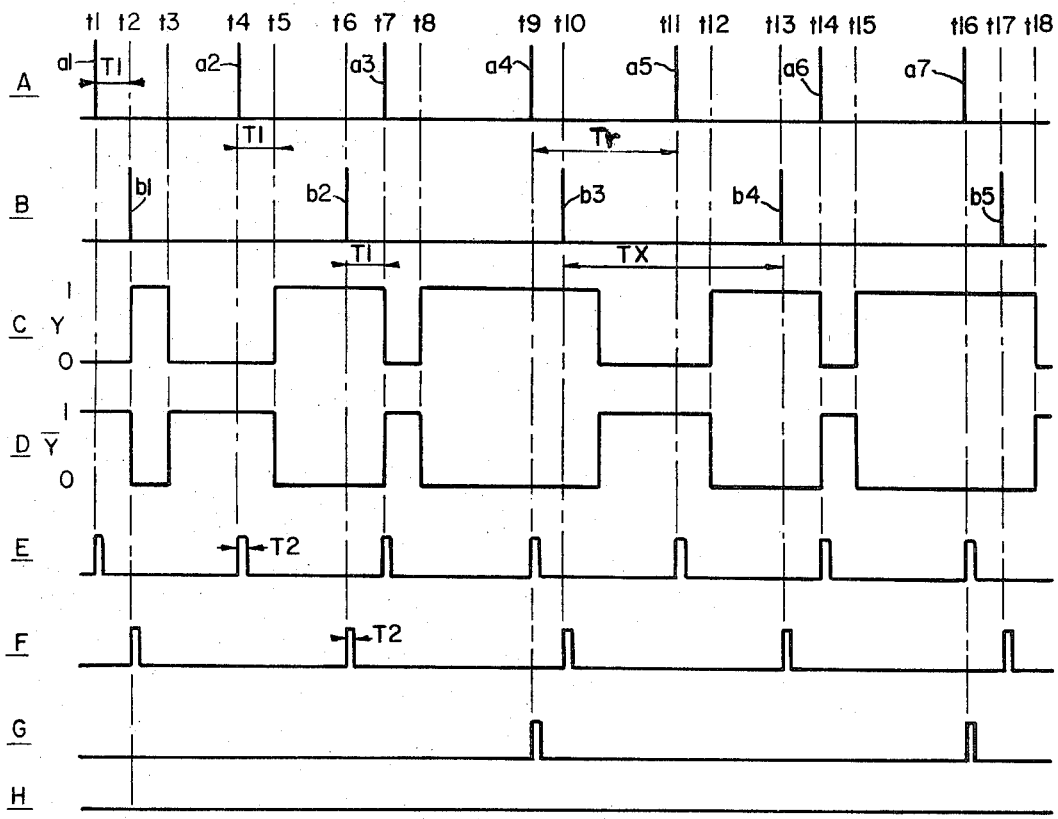
FIG. 2 is a waveform diagram including curves A through H which are utilized in explaining the operation of FIG. 1.

Referring to the drawing, the system of FIG. 1 is operative to detect a frequency difference between a reference frequency $fr$ and an unknown frequency $fx$. The reference frequency $fr$ is derived from a reference frequency source R whose output is designated as A and is shown in Curve A of FIG. 2. The unknown frequency $fx$ is derived from an unknown frequency source U whose output is indicated as B and is shown in Curve B of FIG. 2. The outputs A and B, as illustrated in the respective curves A and B of FIG. 2, are shown to be very narrow pulses having equal amplitudes. The originating source for the reference and unknown frequency may of course typically comprise square or rectangular waveforms having varying amplitudes. These waveforms may be processed by limiting and differentiating either the leading or trailing edges of the waveforms to develop the amplitude limited, very narrow pulse waveform as shown in Curves A and B.

The output A of the reference frequency source R thus has a reference frequency $fr$ with a reference time period $Tr$ between respective pulses thereof, and the output B of the unknown frequency source U has an unknown frequency $fx$ with an unknown time period $Tx$ between the respective pulses thereof. For purposes of explanation, the reference frequency $fr$ is shown to be greater than the unknown frequency $fx$ in the example shown in the curves of FIG. 2. As indicated in Curve A the waveform includes a plurality of reference pulses $a$. These pulses are applied to a time delay element $Dr$ which has a time delay T1. Thus the pulses appear at the output of the delay $Dr$ after a time delay of T1. The B-output comprises a plurality of pulses $b$ and are supplied to a similar delay element $Dx$ which also has a time delay T1 wherein the pulses $b$ of the curve B are delayed by a time period T1. The output of the reference delay $Dr$ is applied to the set input of a bistable element comprising a flip-flop FF and the output of the delay $Dx$ is applied to the reset input of the flip-flop FF. The flip-flop FF comprises the only bistable element within the frequency detection system of the present invention.

The flip-flop FF has complementary outputs Y and $\overline{Y}$ as indicated in FIG. 2. In the reset condition of the flip-flop the Y output is a ZERO and the complementary $\overline{Y}$-output is a ONE. The Y- and $\overline{Y}$-outputs of the flip-flop FF are shown in Curves C and D, respectively. The C output of the flip-flop FF is applied as one input to an AND logic circuit $Ar$ and the D-output which is the complement of the C-output, is applied as one input to an AND logic circuit $Ax$.

The reference output A of the reference frequency source R is also applied in an undelayed manner to a monostable element $Mr$ which provides a pulse output E such as shown in curve E of FIG. 2 in response to the respective pulse signals from curve A. The monostable $Mr$ is designed to supply output pulses of a time duration T2 which is shorter than the time delay T1 of the delay elements $Dr$ and $Dx$. The output B of the unknown frequency source U is applied directly to a monostable element $Mx$, which is similar to the monostable $Mr$, and which supplies a pulse output F such as shown in curve F of FIG. 2 comprising pulses having a pulse width T2.

The output E of the monostable $Mr$ is supplied at the second input to the AND $Ar$, and the output F of the monostable $Mx$ supplies the second input to the AND $Ax$. The respective outputs G and H of the AND logic element $Ar$ and $Ax$ are shown in curves G and H, respectively, of FIG. 2.

At a time $t1$ the monostable $Mr$ supplies an output pulse E in response to the reference pulse $a1$, and the output E is applied to the AND $Ar$. However, since the flip-flop output C is at a ZERO state, the AND $Ar$ does not supply an output G. Since at the time $t1$, no B-pulse output is supplied by the unknown frequency source U, the monostable $Mx$ does not supply an output F and therefore the AND $Ax$ supplies no output at its output H.

At a time $t2$, which is after a time delay T1 from the occurrence of the time $t1$, the pulse $a1$ appears at the output of the delay $Dr$ to provide a set input to the flip-flop FF which causes the flip-flop to reverse output states as shown in curves C and D, with the Y-output going to a ONE and the $\overline{Y}$ output going to ZERO. The ONE output appearing at the C-input to the AND $Ar$, however, does not permit the AND $Ar$ to provide a G-output since the E-input thereto prior to the time $t2$ has reverted to a ZERO state.

Approximately at the time $t2$ an unknown frequency pulse $b1$ occurs which causes the monostable $Mx$ to output a pulse having a time duration of T2 as shown in Curve F. However, since the D-output of the flip-flop at the time $t2$ has been changed to a ZERO output, the AND $Ax$ does not provide an H-output at this time. After a time delay T1 as determined by the delay element $Dx$ the flip-flop FF receives a reset input in response to the delayed pulse $b1$ so that the output states are changed with the Y-output going to a ZERO and the $\overline{Y}$-output going to a ONE. However, due to the time delay T1 the AND $Ax$ does not supply an output in that the monostable output F has terminated by the end of the time delay at the time $t3$.

At a time $t4$ a reference pulse $a2$ occurs causing the monostable $Mr$ to provide an output E. The AND $Ar$, however, is blocked by the ZERO output C from the flip-flop FF. After the time delay T1, at a time $t5$, the flip-flop FF receives a set input from the delay Dr which causes the flip-flop to change output states with the Y-output going to a ONE and the $\bar{Y}$-output going to a ZERO. At a time $t6$ a pulse $b1$ occurs in the B-waveform which causes the monostable Mx to output a pulse as shown in Curve F. After the time delay T1, at a time $t7$, the delay Dx supplies a reset input to the flip-flop FF so that the Y-output goes to a ZERO and the $\bar{Y}$ goes to a ONE output. Accordingly, no output H is supplied by the AND Ax at this time. At the time $t7$ an output pulse $a3$ is provided by the reference frequency source R which causes the monostable Mr to supply an output E. However, the C-output of the flip-flop FF is at a ZERO state, therefore, the AND Ar does not supply an output at this time. After the time delay T1 caused by the delay Dr, the flip-flop FF goes to its set state with the Y-output going to a ONE and the $\bar{Y}$-output going to a ZERO at the time $t8$.

At the time $t9$ the reference frequency source R supplies a reference pulse $a4$, which it should be noted occurs before the next unknown frequency pulse $b3$ occurs, as shown in Curve B which does not occur until the time $t10$. The period Tr between the various pulses of the output A is thus shorter than the period Tx between the pulses of the output B.

At the time $T9$ in response to the reference pulse $a4$ the monostable Mr supplies an output E to the AND Ar. The other input to the AND Ar is also a ONE since the flip-flop FF has remained in the output state where the C-output is a ONE and the D-output is a ZERO since the time $t8$. Hence with the coincidence of monostable output E and the C-output from the flip-flop FF, the AND Ar supplies a G-output at the time $t9$ which is indicative of a frequency difference between the reference frequency $fr$ and the unknown frequency $fx$ and also demonstrates the fact that the reference frequency $fr$ is a higher frequency than the unknown frequency $fx$.

After a time delay T1 caused by the delay Dr a set input is applied to the flip-flop FF; however, since the flip-flop is already in its set output state this pulse will not cause the flip-flop to change output states. At approximately the time $t10$ the pulse $b3$ from the unknown frequency source U occurs which causes the monostable Mx to supply pulse output F to the AND Ax. However, with the flip-flop output $\bar{Y}$ being at a ZERO, the AND Ax does not supply an H-output. After a time delay T1 from the time $t10$ when the pulse $b3$ occurred, the delay Dx will supply a reset input to the flip-flop FF which will cause the outputs thereof to revert with the Y-output being a ZERO and the $\bar{Y}$-output being a ONE.

At the time $t11$ the next reference pulse $a5$ occurs which causes the monostable Mr to supply an E-output to the AND Ar. However, with the flip-flop in the indicated state, no output G will be provided at the time $t11$. After a time delay T1 caused by the delay Dr occurring, at a time $t12$, a set input will be provided to the flip-flop FF which will cause the flip-flop to change output states with the Y-output going to a ONE and the $\bar{Y}$-output going to a ZERO.

At a time $t13$ a pulse $b4$ is provided by the unknown frequency source U which causes the monostable Mx to output a pulse F. However, the D-output of the flip-flip FF at this time prevents an H-output from being supplied by the AND Ax. At a time $t14$ the delay Dx supplies a reset input to the flip-flop FF causing it to change output states with the C-output going to a ZERO and the D-output going to a ONE. At approximately the time $t14$ a reference pulse $a6$ is supplied by the reference source R which causes the monostable Mr to supply an output E and after a time delay T1 supplies a set input to the flip-flop FF via the delay Dr which causes the output C of the flip-flop FF to go to a ONE and the output D to go to a ZERO at a time $t15$.

At a time $t16$, which it should be noted is before the next output pulse $b5$ of the unknown frequency source U occurs at a time $t17$, a reference pulse $a7$ occurs causing the monostable Mr to supply an output E to the AND Ar which already has a ONE input from the output C of the flip-flop FF already applied to the other input thereto. Thus an output G is supplied from the AND Ar being indicative that the reference frequen-cy $fr$ is at a higher frequency than the unknown frequency $fx$.

The flip-flop FF remains in the output state as indicated at the time $t16$ until a time $t18$, which is a time period T1 later than the time $t17$ at which the $b5$ pulse appears. The operation of the frequency detection system thus continues as described with an output G being provided by the AND Ar whenever two pulses $a$ in the output A occur before succeeding pulses $b$ of the output B occur.

The system operates in an analogous fashion should the unknown frequency $fx$ be higher than the reference frequency $fr$. In this instance the AND Ax would supply an output H whenever two of the unknown frequency pulses $b$ occurred between succeeding of the reference pulses $a$. It can thus be seen that the system functions through the use of only the single flip-flop FF, the two time delays Dr and Dx, the two monostables Mr and Mx and the two AND elements Ar and Ax. The flip-flop FF operates to control whether or not the respective AND elements Ar or Ax permits the output of the respective monostables Mr or Mx to be translated through the AND at the occurrence of a reference pulse or an unknown frequency pulse.

From the following analysis it may be seen that the present system has high resolving accuracy for detecting differences between the reference frequency for an unknown frequency $fx$, particularly at relatively low frequency levels in the low KHz. range. Considering the following equation relating the periods of the reference and unknown frequencies and taking into account the time delay T1 and any known time jitter between the reference and unknown periods it may be established:

$$Tx \quad Tr \quad (T1 \quad Tj); (fr \quad fx)$$

where
- $Tr$ ... period time of reference signal
- $Tx$ ... period time of unknown signal
- $T1$ ... time delay as shown in FIG. 1
- $Tj$ ... peak value of relative jitter between reference and unknown.

Substituting the following practical values into the above equation we find:

$Tr \quad 10 \quad$ sec.
$T1 \quad 2 \quad 10 \quad$ sec.
$Tj \quad 10 \quad$ sec.
$Tx \quad 10 \quad 3 \quad 10 \quad 1.0003 \; 10 \; 3$ sec.
$fr \quad fx \quad (1/Tr) \quad (1/Tx)$
$fr \quad fx \quad (1/10 \;) \quad (1/1.0003 \quad 10 \;)$
$fr \quad fx \quad 0.0003 \quad 10$
$fr \quad fx \quad 0.0003 fr$ It may thus be seen that taking the above defined parameters that the minimum detectable frequency difference between the reference frequency $fr$ and the unknown frequency $fx$ is 0.03 percent of the reference frequency or 0.3 Hz. at 1,000 Hz. Hence it may be understood that the resolving accuracy of the proposed system is quite high while utilizing only the single bistable element FF and the other simple logic components as described above with respect to FIG. 1.

I claim as my invention:

1. In a system for detecting a frequency difference and direction of difference between a reference signal having a known frequency and an unknown signal having an unknown frequency, the combination of:

monostable means for providing first and second monostable outputs in response to said reference and unknown signals respectively;

delay means for responding to the presence of each of said reference and unknown signals by similarly delaying each of said reference and unknown signals respectively;

a two condition bistable means having first and second inputs and first and second outputs, the delayed reference and unknown signals being applied input signals to said first and second inputs respectively, the presence of an input signal at said first input assuring a first output condition at said first output and the presence of an input signal at said second input assuring a second output condition at said second output; and logic means responsive to said first monostable output and said first output condition of said bistable means to provide a first detection output when said known and unknown frequencies have a first predetermined relationship therebetween and responsive to said second monostable output and said second output condition to provide a second detection output when said known and unknown frequencies have a second predetermined relationship therebetween.

2. The combination of claim 1 wherein:

said first and second monostable outputs have predetermined time durations, the period of delay of said reference and unknown signals by said delaying means exceeding said predetermined time durations.

3. The combination of claim 2 wherein:

said bistable means comprises a flip-flop element having a set and a reset input, the delayed reference signal being applied to said set input and the delayed unknown signal being applied to the reset input, said flip-flop element being non-responsive to inputs applied to either the set or reset input until a reset or set input respectively is received.

4. The combination of claim 3 wherein:

said logic means includes a first AND circuit for receiving said first monostable output and said first output condition defining that said first predetermined relationship is that said known frequency exceeds said unknown frequency, and a second AND circuit for receiving said second monostable output and said second output condition defining that said unknown frequency exceeds said known frequency.

5. The combination of claim 4 wherein:

said monostable means includes first and second monostable elements for providing respectively said first and second monostable outputs having substantially equal time durations, said delay means includes first and second delay elements for delaying respectively said reference and unknown signals by said predetermined time delay.

* * * * *